(12) United States Patent
Anderson

(10) Patent No.: US 8,241,717 B1
(45) Date of Patent: Aug. 14, 2012

(54) CARBON-BASED BIOFILM CARRIER

(75) Inventor: Steven M. Anderson, Butte, MT (US)

(73) Assignee: SepticNet Inc., Butte, MT (US)

( * ) Notice: Subject to any disclaimer, the term of this patent is extended or adjusted under 35 U.S.C. 154(b) by 269 days.

(21) Appl. No.: 12/542,643

(22) Filed: Aug. 17, 2009

Related U.S. Application Data

(60) Provisional application No. 61/090,290, filed on Aug. 20, 2008.

(51) Int. Cl.
*B27M 3/00* (2006.01)

(52) U.S. Cl. ..... 428/35.6; 261/94; 261/95; 261/DIG. 72

(58) Field of Classification Search ............... 428/35.6; 261/94, 95, DIG. 72
See application file for complete search history.

(56) References Cited

U.S. PATENT DOCUMENTS

| | | | |
|---|---|---|---|
| 3,957,931 A * | 5/1976 | Ellis et al. ............. 261/98 |
| 4,806,228 A | 2/1989 | Beneke et al. |
| 5,292,657 A | 3/1994 | Rutherford |
| 5,304,423 A * | 4/1994 | Niknafs et al. ............ 428/402 |
| 5,543,039 A | 8/1996 | Odegaard |
| 5,730,916 A * | 3/1998 | Kunzel et al. ............. 264/29.4 |
| 5,779,886 A | 7/1998 | Couture |
| 5,985,148 A | 11/1999 | Liu |
| 6,007,915 A * | 12/1999 | Rukovena ............. 428/397 |
| 6,036,863 A | 3/2000 | Brockdorff |
| 6,126,829 A | 10/2000 | Gunnarsson |
| 6,156,204 A | 12/2000 | Todd |
| 6,214,619 B1 | 4/2001 | Sato et al. |
| 6,277,279 B1 | 8/2001 | Hruza |
| 6,383,373 B1 | 5/2002 | Nakao |
| D465,257 S | 11/2002 | Van Olst |
| 6,551,511 B1 | 4/2003 | Murasawa |
| 6,631,890 B1 | 10/2003 | Lau |
| 6,666,436 B1 | 12/2003 | Lerner |
| 6,726,838 B2 | 4/2004 | Shechter |
| 6,811,147 B2 | 11/2004 | Lau |
| 6,852,227 B1 | 2/2005 | Petrone |
| 6,908,753 B1 | 6/2005 | Maekawa |
| 6,936,446 B2 | 8/2005 | Kallenbach |
| 7,014,175 B2 | 3/2006 | Honnell |
| 7,030,287 B2 | 4/2006 | Murasawa |
| 7,189,323 B2 | 3/2007 | Lofqvist |
| 7,364,707 B2 | 4/2008 | Davis |
| 7,775,507 B2 * | 8/2010 | Niknafs et al. ............. 261/94 |
| 2005/0178724 A1 | 8/2005 | Murasawa |

* cited by examiner

*Primary Examiner* — N. Edwards

(74) *Attorney, Agent, or Firm* — Jean Kyle

(57) ABSTRACT

A carbon-based biofilm carrier is formed of saturated fatty acids and saturated fatty alcohols. The carriers are shaped with a hollow center and have a length that ranges from bout 0.3 to about 1.5 times its outer diameter. The shape provides both maximum surface area and maximum protection during aerobic and anaerobic biological treatment of wastewater.

13 Claims, 2 Drawing Sheets

CARBON-BASED BIOFILM CARRIER

CROSS-REFERENCE TO RELATED APPLICATIONS

This application claims the benefits of U.S. Provisional Application No. 61/090,290 filed Aug. 20, 2008, the disclosure of which is hereby incorporated by reference in its entirety including all figures, tables and drawings.

STATEMENT REGARDING FEDERALLY SPONSORED RESEARCH OR DEVELOPMENT

Not Applicable

REFERENCE TO SEQUENCE LISTING, A TABLE, OR COMPUTER PROGRAM LISTING COMPACT DISC APPENDIX

Not Applicable

TECHNICAL FIELD

The present invention relates to a biofilm carrier for use in wastewater, surface water, and/or groundwater treatment. More particularly, the present invention relates to a solid, carbon-based biofilm support media comprised of combinations of carbon-based materials including saturated fatty acids, saturated fatty alcohols, sawdust, cellulose base acetate polymers, biodegradable plastics, combination thereof, shaped in a manner to provide for maximum surface area and maximum protection during both aerobic and anaerobic biological treatment of water.

BACKGROUND OF THE INVENTION

A wide variety of biofilm carriers, also called biofilm support media or biofilm growth media, are currently being used in water and wastewater treatment processes. The existing biofilm carriers are made of inert (non-carbon based) materials, often some form of plastic, ceramic, or a number of other man-made polymers. See, for example, U.S. Pat. Nos. 7,189,323 B2; 6,936,446 B2; 6,811,147 B2; 6,726,838 B2; 6,666,436 B1; 6,631,890 B1; 6,383,373 B1; 6,214,619 B2; 6,936,170 B1; 6,156,204; 6,126,829; 5,985,148; 5,779,886; 5,543,039.

U.S. Pat. Nos. 6,277,279 B1 ('279) and 6,551,511 B1 ('511) describe the use of carbon-based material in water treatment, but have several distinct limitations. The '279 patent states that combinations of saturated and unsaturated fatty acids are shaped into pellets, powder, granules, or cakes and added to the wastewater at a rate of between 0.01 and 1.0 pounds per thousand gallons of wastewater. The major limitations of the described material include the durability of the combinations of saturated and unsaturated fatty acids, and the effectiveness of the formed shapes. The described carriers would be ineffective in numerous applications such as in an aerated reactor used in the nitrification of wastewater since they are not durable enough to withstand the process. Further, the shapes specified, pellets, powders, granules, and cakes, inhibit optimum performance of the supported biofilm.

U.S. Pat. No. 6,551,511 B1 describes a fatty acid or a fatty alcohol sphere of a diameter no greater that 100 mm on a carrier of polyvinyl alcohol and polyethylene glycol. The major limitations of the material described are the polyvinyl alcohol and polyethylene glycol support structures and the shape of the products. The polyvinyl alcohol and polyethylene glycol support structures are non-reactive, thus will remain in the treatment tank and will have to be periodically removed. Also, the process relies on the pressure drop due to Bernoulli's principle on the surface of the sphere to create an anaerobic zone for processes such as de-nitrification.

Most biofilm carriers are inert and do not provide a carbon-based food source for the supported biofilm. Carbon-based carriers that have been described are not durable enough to perform in all reactor environments and are inefficiently shaped. A need remains for a carbon-based biofilm that is durable and that is configured to provide a strong base for efficiently supporting biofilms.

All patents, patent applications, provisional patent applications and publications referred to or cited herein, are incorporated by reference in their entirety to the extent they are not inconsistent with the teachings of the specification

BRIEF SUMMARY OF THE INVENTION

The present invention is a carbon-based biofilm carrier element designed to be used for wastewater, surface water, and/or groundwater treatment. The carrier element is composed entirely of carbon-based materials including saturated fatty acids, saturated fatty alcohols, sawdust, cellulose base acetate polymers, or biodegradable plastics and any combination of the above material. The carrier element is in the shape of a hollow cylinder, hollow disk or partial hollow sphere where the length of the carrier ranges from about 0.3 to about 1.5 times the maximum outer diameter. The specific surface area of the present invention is not less than 500 m2/m3.

The subject biofilm carrier can be used in municipal and/or on-site wastewater treatment. During wastewater treatment, the bacteria involved in the nitrification process consume the existing biological oxygen demand (BOD) in the wastewater stream, thus leaving a waste stream high in nitrate and low in organic carbon. Without an additional source of carbon, only 40 to 60% of total nitrogen can be removed from the system based on the average analysis of on-site septic system wastewater. The source of organic carbon necessary to achieve over 95% nitrate removal is incorporated into the claimed biofilm carrier.

The subject biofilm carrier can also be used as a component of a more efficient simultaneous nitrification/de-nitrification process. By design, the present invention has numerous areas which protect the active biofilm during the aeration/nitrification process, thus providing anaerobic zones and aerobic zones on each carrier element. The de-nitrification process takes place in the anaerobic zones regardless of the size of the carrier element and regardless of Bernoulli's principle, thus resulting in an efficient simultaneous nitrification/de-nitrification process.

BRIEF DESCRIPTION OF THE SEVERAL VIEWS OF THE DRAWING

An embodiment of the invention will now be described by way of example with reference to the accompanying drawings, in which.

DETAILED DESCRIPTION OF THE INVENTION

The present invention concerns a carbon-based biofilm carrier in a hollow shape constructed of a combination of carbon-based materials such as, saturated fatty acids, saturated fatty alcohols, sawdust, cellulose based acetate polymers, or biodegradable plastics and formed traditional forming methods. Carriers are formed in a hollow shape to provide maximum surface area and protection during aerobic and anaerobic biofilm processes.

Figure 1:
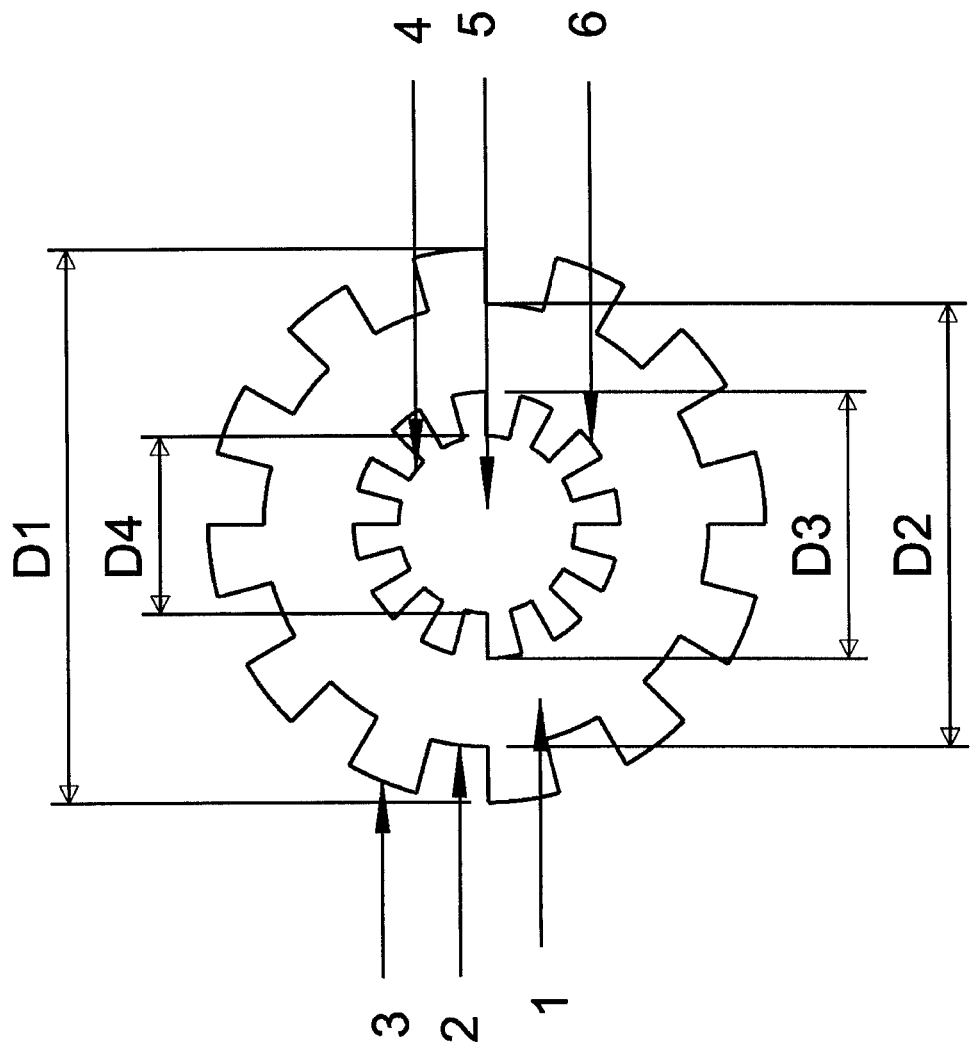
FIG. 1 is a cross-section end view of a preferred embodiment of the biofilm carrier of the subject invention.
Figure 2:
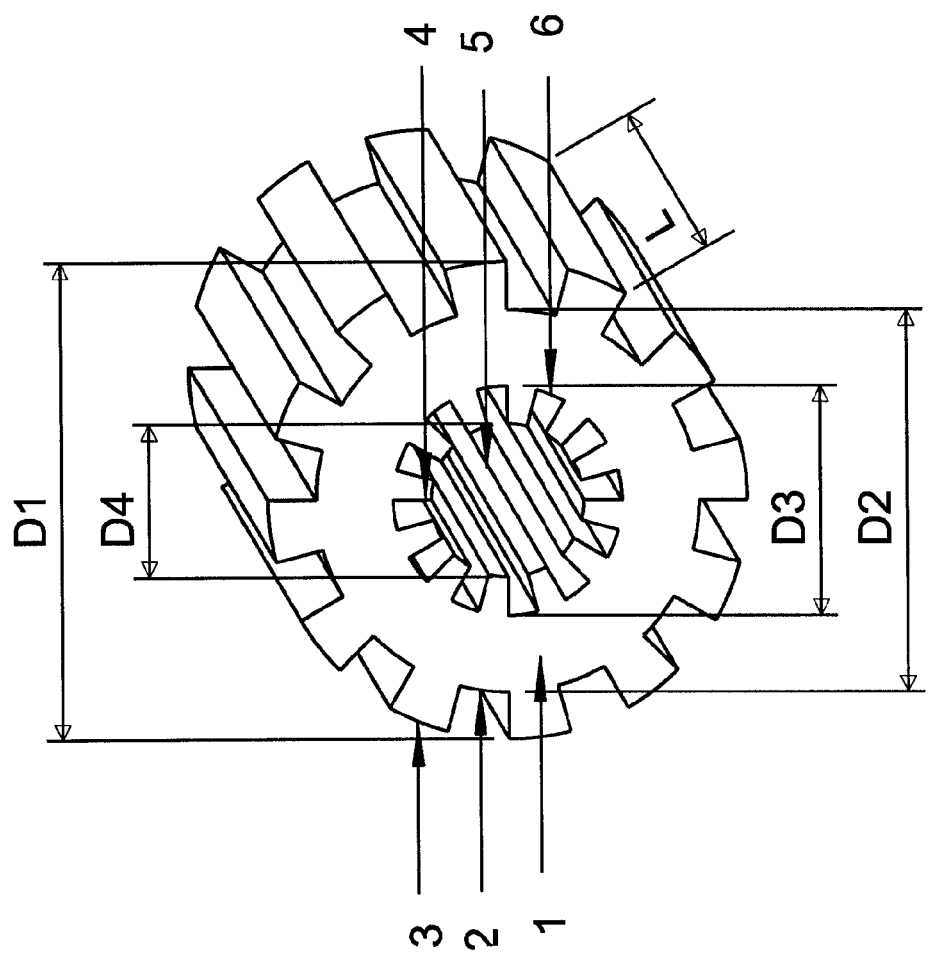
FIG. 2 is perspective view of a preferred embodiment of the biofilm carrier of the subject invention.

FIG. 1 and FIG. 2 show a cross-section end view and a perspective view of a preferred embodiment of the carbon-based biofilm carrier 1 of the subject invention. The subject carriers have a hollow center 5. In a particularly preferred embodiment, the carrier is in the shape of a hollow cylinder and has outer grooves 2; outer ridges 3; inner ridges 4; inner grooves 6; and a hollow center 5. Further, the outer grooves 2; outer ridges 3; inner ridges 4; and inner grooves 6 extend the entire length or thickness of the carbon-based biofilm carrier 1.

Preferably, the carbon-based biofilm carriers 1 are in the shape of a hollow cylinder, hollow disk, or partial hollow sphere where the length or thickness L of the carrier ranges from about 0.3 to about 1.5 times the maximum outside diameter D1. The maximum outside diameter D1 is between about 1.5 and about 30 cm. The upper constraints on D1 are solely based on current manufacturing techniques and not product performance. The diameter to the outer groove D2 should be between about 0.75 D1 and about 0.90 D1. The diameter to the inner groove D3 should be between about 0.40 D1 and about 0.50 D1. The diameter to the inner ridge D4 should be between about 0.30 D1 and about 0.40 D1. The above provides the best configuration known for the biofilm carriers of the subject invention currently. One skilled in the art would recognize that new manufacturing techniques may allow changes in this configuration that maintain or increase performance of the carrier. Further, one would recognize that changes in the ratios specified above may result in inadequate performance and structural characteristics.

The carbon-based biofilm carriers 1 of the subject invention can be made of various combinations of saturated fatty alcohols and/or saturated fatty acids with at least 14 carbon atoms and no more than 26 carbon atoms. Acids and alcohols suitable for construction of the present carriers, include, but are not limited to: myristic (tetradecanoic) acid; palmitic (hexadecanoic) acid; stearic (octadecanoic) acid; arachidic (eicosanoic) acid; behenic (docosanoic) acid; lignoceric (tetracosanoic) acid; myristyl alcohol (1-tetradecanol); cetyl alcohol (1-hexadecanol); stearyl alcohol (1-octadecanol); arachidyl alcohol (1-eicosanol); behenyl alcohol (1-docosanol); lignoceryl alcohol (1-tetracosanol); and ceryl alcohol (1-hexacosanol). The carbon-based biofilm carriers 1 are formed by extrusion, injection, and/or cast molding techniques.

Following are examples which illustrate procedures, including the best mode, for practicing the invention. These examples should not be construed as limiting.

Example 1

100% Cetyl Alcohol

Approximately 25 kilograms of cetyl alcohol flakes were melted in a commercially available candle wax melting apparatus. The thermostat was set at 170° F. The melted cetyl alcohol dispensed from the wax melter to custom molds made of polyurethane with dimensions of D1=1.5 inches; D2=1.2 inches; D3=D4=0.25 inches; and L=0.75 inches. The molds were allowed to cool and solidify and were then extracted from the molds using a steel push rod. This process was repeated until 25 kilograms of carriers were completed. The carriers were then placed into the de-nitrification reactor where they provided both a structure and a food source for de-nitrifying bacteria. The influent concentration of nitrate into the reactor was approximately 55.4 mg/L and the effluent nitrate concentration was approximately 3.8 mg/L, or 93% removal.

Example 2

100% Stearic Acid

Approximately 25 kilograms of stearic acid powder was melted in a commercially available candle wax melting apparatus. The thermostat was set at 170° F. The melted stearic acid dispensed from the wax melter to custom molds made of polyurethane with dimensions of D1=1.5 inches; D2=1.2 inches; D3=D4=0.25 inches; and L=0.75 inches. The molds were allowed to cool and solidify and were then extracted from the molds using a steel push rod. This process was repeated until 25 kilograms of carriers were completed. The carriers were then placed into the de-nitrification reactor where they provided both a structure and a food source for de-nitrifying bacteria. The influent concentration of nitrate into the reactor was approximately 30.4 mg/L and the effluent nitrate concentration was approximately <0.5 mg/L, or >98% removal.

Example 3

50% Stearic Acid, 50% Cetyl Alcohol

A homogenous mixture containing approximately 12.5 kilograms of stearic acid powder and 12.5 kilograms of cetyl alcohol flakes was melted in a commercially available candle wax melting apparatus. The thermostat was set at 170° F. The melted stearic acid/cetyl alcohol mixture was dispensed from the wax melter to custom molds made of polyurethane with dimensions of D1=1.5 inches; D2=1.2 inches; D3=D4=0.25 inches; and L=0.75 inches. The molds were allowed to cool and solidify and were then extracted from the molds using a steel push rod. This process was repeated until 25 kilograms of carriers were completed. The carriers were then placed into the de-nitrification reactor where they provided both a structure and a food source for de-nitrifying bacteria. The influent concentration of nitrate into the reactor was approximately 53.2 mg/L and the effluent nitrate concentration was approximately 4.9 mg/L, or >91% removal.

The carbon-based biofilm carriers are formed by traditional cast molding, extrusion molding and/or injection molding techniques. The carriers are easily made using a vessel and heat source adequate to surpass the chosen material's melting point; a means of dispensing the melted material; a mold of the desired shape designed to accommodate the melted material; and a means to remove the solidified carrier from the mold. First, solid carrier material in the form of powder, flakes, or larger pieces is placed in the melting vessel. Heat is added allowing the carrier material to melt. The melted carrier material is dispensed from the melting vessel to the molds. The molds are made of any material that can withstand the heat associated with the melted carrier material. Once in the mold, the melted carrier material assumes the shape of the desired mold and is allowed to cool to a temperature below the melting point of the material, thus creating a solid carrier in the shape of the chosen mold. The solidified carrier material is removed from the mold by any means necessary and the completed solid carrier is packaged or placed in an appropriate bio-reactor. The other methods of manufacturing the carriers mentioned above are standard manufacturing processes and those individuals trained in the manufacturing process could easily manufacture theses carriers with those methods.

In use, a calculated number of the carbon-based biofilm carriers 1 are added to contaminated wastewater, groundwater, and/or surface water treatment facilities. The carbon-based biofilm carriers 1 are added to aerobic reactors, anaerobic reactors, and/or permeable reactive barriers and benefit remediation or treatment of any contamination using biologic methods to remove contamination. The outer grooves 2; outer ridges 3; inner ridges 4; and inner grooves 6 provide adequate surface area for microorganisms to attach to the carbon-based biofilm carrier 1 and provide environments suitable for a wide variety of organisms requiring different conditions. For example, in an aerated reactor used in wastewater treatment, the outer ridges 3, the outer grooves 2, and the ends of the carbon-based biofilm carriers 1 prove an ideal environment for nitrifying bacteria, while at the same time, the inner ridges 4 and the inner grooves 6 of the hollow center 5 provide an anaerobic environment for de-nitrifying bacteria. The structure of the carbon-based biofilm carriers 1 also makes it ideal for use in treating groundwater by means of in-situ permeable reactive barriers. The outer grooves 2; outer ridges 3; inner ridges 4; and inner grooves 6 provide the strength to be buried several meters below the earth's surface and the porosity to allow for adequate flow through the reactor.

The advantages of the present invention include, without limitation, a biofilm carrier used for wastewater, surface water, and/or groundwater treatment that provides adequate structure and material for microorganism-based treatment and/or remediation. The present invention combines the environment for biofilms, and adds carbon material without sophisticated and problematic mechanical liquid dosing systems.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A biofilm carrier element formed from biologically available carbon materials selected from the group consisting of saturated fatty acids, saturated fatty alcohols, sawdust, and cellulose based acetate polymers, the carrier element formed into a shape that has a hollow center.

2. The biofilm carrier of claim 1, wherein said carrier element is formed into a shape selected from the group consisting of a hollow cylinder, a hollow disk, and a hollow partial sphere, and the length of the element is from about 0.3 times to about 1.5 times the outer diameter of the element.

3. The biofilm carrier of claim 1, wherein said carrier element is formed into the shape of a hollow cylinder.

4. The biofilm carrier of claim 1, wherein said hollow cylinder further comprises outer ridges, outer grooves, inner ridges, and inner grooves.

5. The biofilm carrier of claim 4, wherein said outer grooves are from about 0.75 to about 0.09 of an outer diameter of said hollow cylinder, and said inner grooves are from about 0.40 to about 0.50 of the outer diameter of said hollow cylinder, and said inner ridges are about 0.30 to about 0.40 of the outer diameter of said hollow cylinder.

6. The biofilm carrier of claim 1, wherein said saturated fatty acids and said saturated fatty alcohols each comprise at least 16 carbon atoms and comprise less than 26 carbon atoms.

7. The biofilm carrier of claim 6, wherein said saturated fatty acids and said saturated fatty alcohols are selected from the group consisting of myristic (tetradecanoic) acid; palmitic (hexadecanoic) acid; stearic (octadecanoic) acid; arachidic (eicosanoic) acid; behenic (docosanoic) acid; lignoceric (tetracosanoic) acid; myristyl alcohol (1-tetradecanol); cetyl alcohol (1-hexadecanol); stearyl alcohol (1-octadecanol); arachidyl alcohol (1-eicosanol); behenyl alcohol (1-docosanol); lignoceryl alcohol (1-tetracosanol); and ceryl alcohol (1-hexacosanol).

8. A biofilm carrier element formed from biologically available carbon materials selected from the group consisting of saturated fatty acids, saturated fatty alcohols, sawdust, and cellulose based acetate polymers, the carrier element formed into a shape selected from the group consisting of a hollow cylinder, a hollow disk, and a hollow partial sphere, and wherein the length of the element is from about 0.3 times to about 1.5 times an outer diameter of the element.

9. The biofilm carrier of claim 8, wherein said carrier element is formed into the shape of a hollow cylinder.

10. The biofilm carrier of claim 8, wherein said carrier element further comprises outer ridges, outer grooves, inner ridges, and inner grooves.

11. The biofilm carrier of claim 10, wherein said outer grooves are from about 0.75 to about 0.09 of said outer diameter of said carrier element, and said inner grooves are from about 0.40 to about 0.50 of said outer diameter of said carrier element, and said inner ridges are about 0.30 to about 0.40 of said outer diameter of said carrier element.

12. The biofilm carrier of claim 8, wherein said saturated fatty acids and said saturated fatty alcohols each comprise at least 16 carbon atoms and comprise less than 26 carbon atoms.

13. The biofilm carrier of claim 12, wherein said saturated fatty acids and said saturated fatty alcohols are selected from the group consisting of myristic (tetradecanoic) acid; palmitic (hexadecanoic) acid; stearic (octadecanoic) acid; arachidic (eicosanoic) acid; behenic (docosanoic) acid; lignoceric (tetracosanoic) acid; myristyl alcohol (1-tetradecanol); cetyl alcohol (1-hexadecanol); stearyl alcohol (1-octadecanol); arachidyl alcohol (1-eicosanol); behenyl alcohol (1-docosanol); lignoceryl alcohol (1-tetracosanol); and ceryl alcohol (1-hexacosanol).

* * * * *